June 8, 1926.

H. M. TAYLOR

SUSPENSION CLAMP

Filed Oct. 15, 1924

Inventor
Herbert Munro Taylor
by Thurston haughes
attys.

Patented June 8, 1926.

1,587,926

UNITED STATES PATENT OFFICE.

HERBERT MUNRO TAYLOR, OF TORONTO, ONTARIO, CANADA.

SUSPENSION CLAMP.

Application filed October 15, 1924, Serial No. 743,814, and in Canada October 2, 1924.

My invention relates to improvements in suspension clamps for transmission line cables and the object of the invention is to devise an improved clamp for this purpose which will permit the more ready and convenient insertion of the cable, or any intermediate portion thereof, into its supported position in the clamp and which will fully support the cable while the clamp is being tightened upon the cable and while the lineman is making the final adjustments of the clamp upon the cable, so as to relieve the lineman of the necessity of bearing any of the weight of the cable while these adjustments are being made, thus minimizing the risk of injury to the lineman when performing this ordinarily dangerous operation, since all his attention may be given to the work of adjusting and tightening; a further object is to enable a more perfect adjustment of the clamp upon the cable to be made; a further object is to provide a clamp of great strength and durability; a further object is to devise a clamp in which the portion of the clamp which actually engages the cable is of a separate piece from the remainder of the clamp; and a still further object is to devise a clamp which may be more inexpensively produced than former clamps of this class.

Other objects will appear in the course of the following specification.

My invention consists essentially of a suspension clamp comprising suspension means consisting of a steel stirrup open at its lower end and having the lower ends of the legs bent to form hook portions upon which is carried a cable supporting element formed separate from the stirrup and provided with a seat upon which the cable is adapted to rest, the device so formed as to permit insertion of the cable or any intermediate portion thereof into its supported position within the clamp, and a detachable keeper adapted to engage the upper face of the cable for clamping the cable in position upon the seat, all as hereinafter more particularly described and illustrated in the accompanying drawings in which:—

Fig. 1 is a top plan view of one embodiment of my invention.

In the drawings, like characters of reference indicate corresponding parts in the different views.

Figure 2:
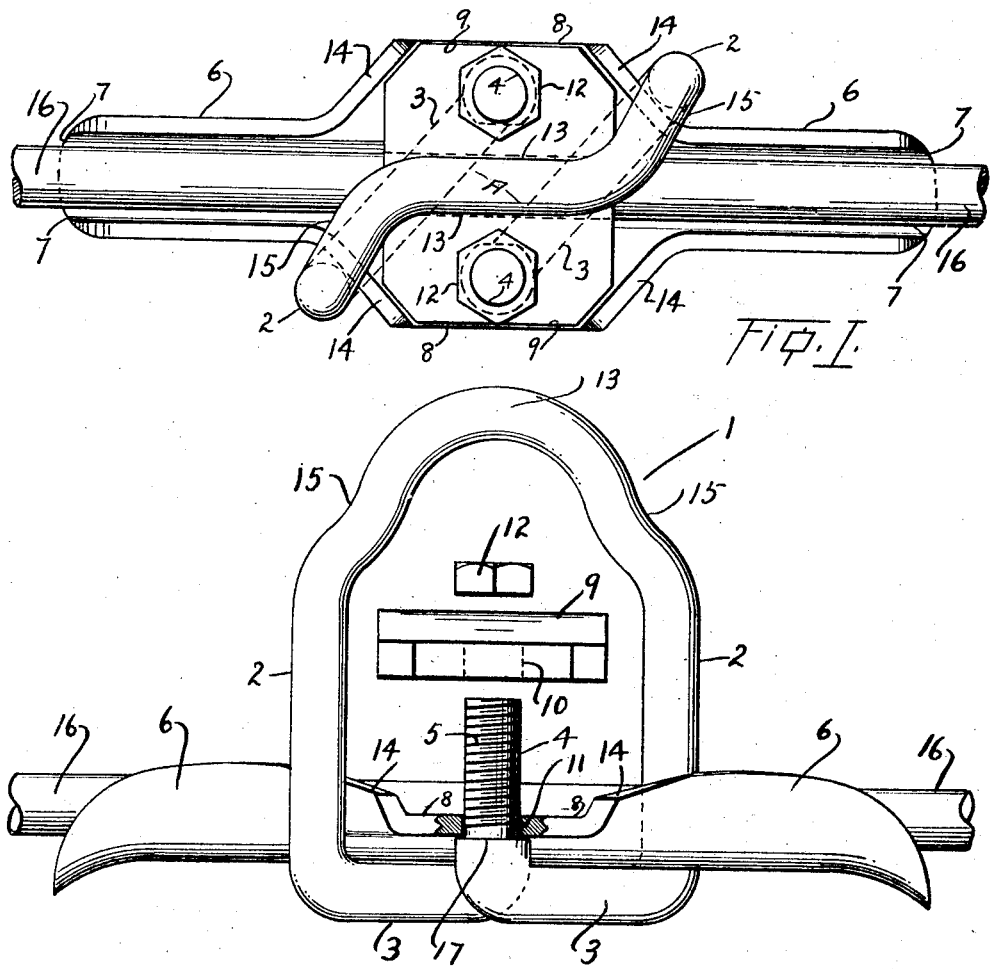
Fig. 2 is a side elevation of Fig. 1 with a portion broken away and a keeper shown in a raised or disengaged position.

My invention comprises a suspension element in the form of a stirrup 1 formed from suitable material, such for instance as steel rod, and open at its lower end. The lower ends of the legs 2 are bent inwardly at 3 in parallelism and upwardly at 4, the bent portions forming spaced apart hook portions, the gap between these hook portions being indicated at "A" in Fig. 1.

The upwardly bent portions 4 are formed with an upwardly disposed shoulder 17, the purpose of which will be hereinafter explained. The extremity of each upwardly bent portion 4 is provided with a screw thread 5.

A cable supporting element 6 is formed from sheet metal and is provided with a longitudinally disposed cable receiving seat 7. The central portion 8 of the element 6 is of greater width than the remainder of the element and forms a flat seat for a keeper 9 which is provided with openings 10 at each side thereof.

The portion 8 of the element 6 is provided, adjacent to either side thereof, with openings 11 adapted to register with the openings 10 of the keeper.

Nuts 12 having engagement upon the threaded portions 5 of the stirrup, serve to secure the keeper in position.

The upper end of the stirrup is indicated by the numeral 13.

The central portion 8 of the element 6 merges into the end portions thereof along the inclined flanges 14.

The stirrup 1 is so formed that the upper closed end 13 thereof is disposed centrally and longitudinally above the element 6, the stirrup then being bent outwardly in opposite directions along the inclined portions 15 and merging into parallel sides 2.

The inwardly bent portions 3 are disposed obliquely with respect to the upper portion 13.

A transmission line cable 16 is shown in its supported position within the clamp in Figs. 1 and 2.

The clamp is assembled by inserting the element 6 between the side legs 2 of the stirrup and lowering so that the portions 4 pass upwardly through the openings 11.

When so mounted it will be observed that the element 6 is firmly held within the stirrup, being supported upon the hook portions 3 and being held in position by the engagement of the upwardly bent portions 4 within the openings 11.

The method of employing my improved clamp is as follows:—

The stirrup 1 is connected to the ordinary suspension insulator after the usual manner and the stretched line cable 16 is passed upwardly into the stirrup through the gap "A" between the lower bent ends of the stirrup.

The cable supporting element 6 is then inserted between the legs 2 of the stirrup below the cable and is lowered into its engaged position, as illustrated in Figs. 1 and 2. The cable is then seated upon its seat 7 formed in the element 6.

When in this position it will be observed that the cable is fully supported by the clamp independently of and before the keeper 9 has been tightened into position.

This relieves the lineman of all necessity of carrying any of the weight of the cable line while the final adjustments of the clamp upon the cable are being made, so that he can give his full attention to obtaining a perfect adjustment.

The keeper 9 is now secured in position and forms a clamp engaging the upper face of the cable for securely holding the cable in position within the clamp.

In order to prevent distortion of the stirrup by its being drawn upwardly through the orifices 11 as the nuts 12 are tightened upon the threads 5, the upwardly disposed shoulders 17 are provided, which engage the under face of the element 6 (see Fig. 2).

It will be noted that in a clamp constructed according to my invention the cable supporting member is made separately from the suspension stirrup and may thus be made of different material as desired, such for instance as a steel or aluminum plate.

In the case of cables which have a steel centre with the outer strands of aluminum, this cable supporting element, if made of aluminum, would prevent damage to the cable due to electrolysis.

From the foregoing it will be apparent that I have devised valuable improvements in suspension clamps of the class described whereby the objects of my invention have been attained.

Various modifications may be made in my invention without departing from the spirit thereof or the scope of the claims and therefore the exact forms shown are to be taken as illustrative only and not in a limiting sense and I desire, that only such limitations shall be placed thereon as are imposed by the prior art or are specifically set forth in the appended claims.

What I claim as my invention is:

1. A suspension clamp for a line cable comprising, a suspension stirrup open at its lower end, the lower ends of the legs of the stirrup bent inwardly and upwardly to form spaced apart hook portions, a cable supporting element consisting of a plate formed with a seat upon which the cable is adapted to rest, said supporting element detachably mounted within the stirrup and supported by the hook portions and provided with openings through which the upwardly bent ends of the stirrup extend, said upwardly bent ends threaded, a detachable keeper engaging the upper face of the cable and provided with openings through which said threaded ends project, and nuts having threaded engagement upon the threaded extremities of the stirrup.

2. A suspension clamp for a line cable comprising, a suspension stirrup open at its lower end, the lower ends of the legs of the stirrup bent inwardly and upwardly to form spaced apart hook portions, a cable supporting element consisting of a plate formed with a seat upon which the cable is adapted to rest, said supporting element detachably mounted within the stirrup and supported by the hook portions and provided with openings through which the upwardly bent ends of the stirrup extend, upwardly disposed shoulders formed on the upwardly bent ends of the stirrup in spaced relation from the extremities thereof and engaging the under face of the cable supporting element, said upwardly bent ends threaded, a detachable keeper engaging the upper face of the cable and provided with openings through which said threaded ends project, and nuts having threaded engagement upon the threaded extremities of the stirrup.

HERBERT MUNRO TAYLOR.